UNITED STATES PATENT OFFICE.

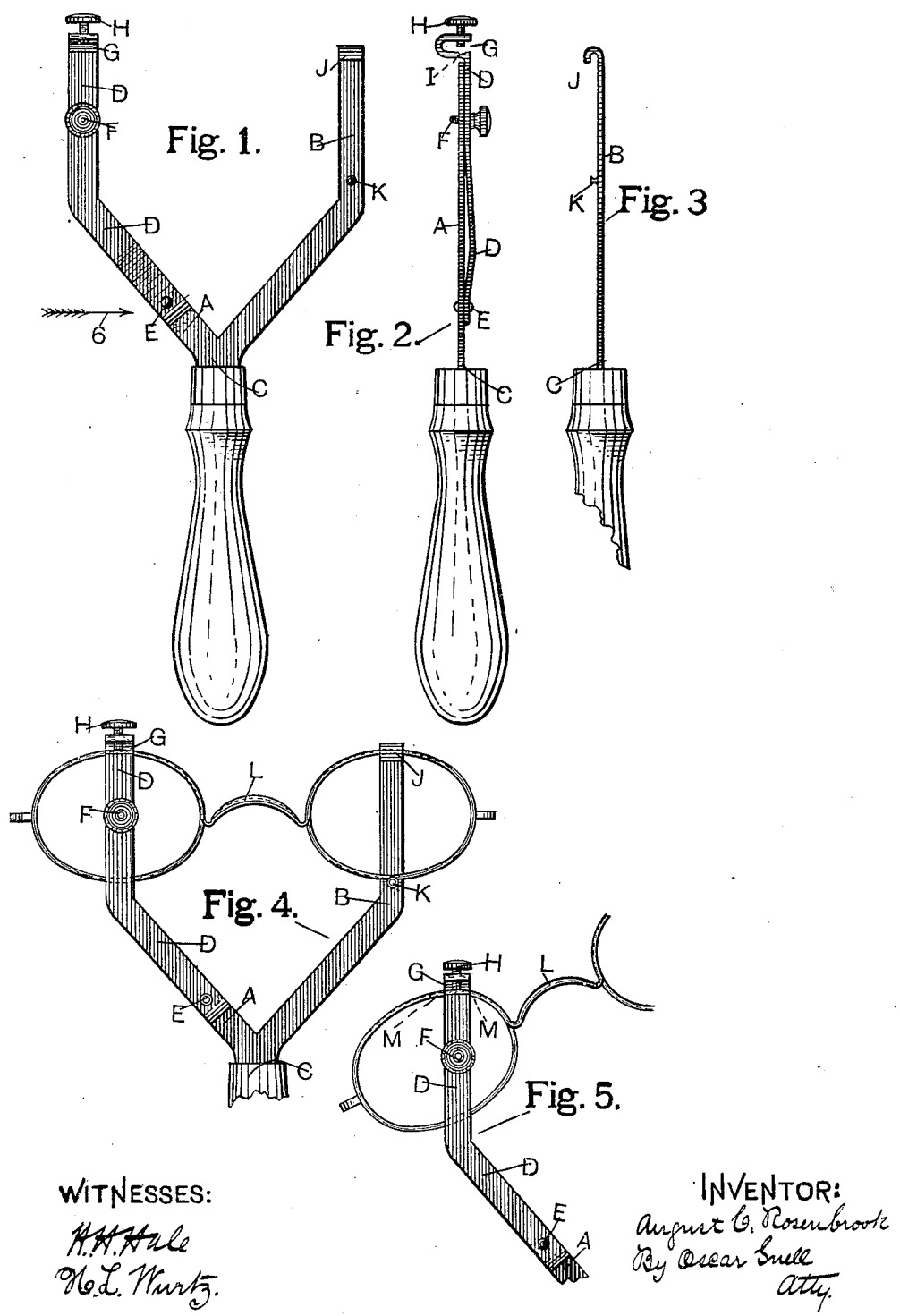

AUGUST C. ROSENBROOK, OF BROOK, INDIANA.

HOLDER FOR SOLDERING SPECTACLES.

SPECIFICATION forming part of Letters Patent No. 650,870, dated June 5, 1900.

Application filed March 16, 1900. Serial No. 8,872. (No model.)

*To all whom it may concern:*

Be it known that I, AUGUST C. ROSENBROOK, a citizen of the United States, residing at Brook, in the county of Newton and State of Indiana, have invented a new and useful Holder for Soldering Spectacles, of which the following is a specification.

My invention relates to means adapted to hold spectacle-frames in proper relative form while being manufactured or undergoing repairs, as is fully described hereinafter and illustrated in the accompanying drawings, in which—

Figure 1 is a front elevation of the holder, and Fig. 2 is a side elevation looking in the direction indicated by arrow 6. Fig. 3 is an elevation of the right-hand side, which is the opposite side to that shown in Fig. 2. Fig. 4 is a front elevation of the instrument with most of the handle broken away and showing a spectacle-frame in position for repairs. Fig. 5 is a front elevation of the left-hand portion of the frame, as shown in Fig. 4, to illustrate the clamp as it appears when holding one portion of a spectacle-frame at an angle relative to what is shown in Fig. 4 and is intended to illustrate the manner of holding small pieces of the frame which are to be soldered in position.

The frame of the holder comprises two arms A and B, which terminate at one end in a handle C. One of the arms is provided with a spring-clamp D, which is loosely secured to the arm by any well-known means, such as a rivet or screw at E. A screw having a milled head F is engaged in a screw-threaded hole in arm A, and the screw passes loosely through a hole in the clamp-jaw D. At the top end of the clamp is a portion bent upon itself and forming a loop G. Through the outer end portion of the loop G is a screw H, whose inner end is adapted to clamp the spectacle-frame when disposed within the loop. Under the inner end of the screw H is a shallow groove I, Fig. 2, within the loop G, which groove serves as a bed to retain the rounded outer surface of a spectacle-frame when under the pressure of screw H. Arm B is formed into a hook J at the outer end, and on the side there is a projecting head K, the hook J and the head K being so disposed as to hold one end of a spectacle-frame, while the other is held by means of the clamp D and screw H and loop G.

It is obvious that should it be necessary to solder one or both ends of the bridge L to the lens-frames the latter may be securely held in proper position, as shown in Fig. 4, until the work is accomplished.

Should either of the lens-frames be broken or should it be necessary to insert a new piece, such as is shown at M, Fig. 5, the lens-frame is held by the clamp D, and screw H holds the piece M in the exact position desired in groove I, so that the lens-frame ends may be brought into accurate register with the ends of the piece to be inserted and soldered firmly in position without danger of movement.

I claim as my invention—

A holder for soldering spectacles, comprising two arms joined to a handle to form a bifurcation, one of said arms having a jaw loosely attached at one end to the face of the arm, and the other end portion of the jaw attached to the outer end portion of the arm by means of a screw, and forming a clamp with the face thereof, the outer end of the jaw formed into a loop, and a screw disposed through the outer end member of the loop and adapted to form a clamp acting at a right angle to the movement of the first-named clamp-screw, in combination with means on the second-named arm for supporting one end of a spectacle-frame while the opposite end is held in proper position in the clamps, as and for the purpose stated.

AUGUST C. ROSENBROOK.

Witnesses:
 ORRIE B. STONEHILL,
 PHILIP STONEHILL.